United States Patent [19]

Suzuki et al.

[11] Patent Number: 4,704,567
[45] Date of Patent: Nov. 3, 1987

[54] BRUSHLESS D.C. MOTOR HAVING ALTERNATING WIDER AND NARROWER POLE SHOES

[75] Inventors: Yasuo Suzuki, Shijonawate; Tetsuo Kawamoto, Yawata; Ryo Motohashi, Nishinomiya; Masato Nagai, Himeji; Katsumi Takegawa, Kasai; Naohiro Taniguchi, Tatsuno, all of Japan

[73] Assignee: Matsushita Electric Works, Ltd., Osaka, Japan

[21] Appl. No.: 905,232

[22] Filed: Sep. 9, 1986

[30] Foreign Application Priority Data

Sep. 25, 1985 [JP] Japan .................................. 60-211307

[51] Int. Cl.$^4$ ............................................ H02K 29/08
[52] U.S. Cl. ..................................... 318/254; 318/138; 318/439; 310/68 R
[58] Field of Search ............ 318/138, 254, 439; 310/49 R, 67 R, 68 R, 156, 185, 188, 216, 218, 268

[56] References Cited

U.S. PATENT DOCUMENTS

| | | | |
|---|---|---|---|
| 1,568,478 | 1/1926 | Smith | 310/188 X |
| 1,701,362 | 2/1929 | Haddrell | 310/186 X |
| 2,030,108 | 2/1936 | Hathaway | 310/186 |
| 2,340,669 | 2/1944 | Lange | 310/186 X |
| 3,473,069 | 10/1969 | Herbert | 318/138 |
| 3,614,495 | 10/1971 | Suzuki et al. | 310/162 |
| 4,144,467 | 3/1979 | Nakajima | 310/156 X |
| 4,357,563 | 11/1982 | Ohno | 318/138 X |
| 4,429,263 | 1/1984 | Muller | 318/254 |
| 4,549,104 | 10/1985 | Nimura et al. | 310/67 R |
| 4,563,620 | 1/1986 | Komatsu | 318/439 X |
| 4,644,233 | 2/1987 | Suzuki | 318/254 |

FOREIGN PATENT DOCUMENTS

| | | | |
|---|---|---|---|
| 49-148408 | 4/1973 | Japan | 318/254 |
| 52-51513 | 4/1977 | Japan | 310/49 R |

Primary Examiner—William M. Shoop, Jr.
Assistant Examiner—Bentzu Ro
Attorney, Agent, or Firm—Burns, Doane, Swecker & Mathis

[57] ABSTRACT

A brushless D.C. motor wherein one of projected stator poles positioned to be mutually equally spaced in mechanical angle is made sufficiently smaller than the other as partly cut off at circumferentially expanding pole tooth part, the stator poles being respectively polarized depending on controllably varied direction of direct current to coils on the poles by means of a rotor position detecting Hall element which detects the polarity at a predetermined position of the rotor, for allowing the rotor to self-start constantly in one direction with a remarkably increased starting torque.

5 Claims, 9 Drawing Figures

ROTARY DIRECTION

BRUSHLESS D.C. MOTOR HAVING ALTERNATING WIDER AND NARROWER POLE SHOES

TECHNICAL BACKGROUND OF THE INVENTION

This invention relates to brushless DC motors and, more particularly, to a brushless motor which functions to self-start with a direct current to be optimumly utilizable in small electrical appliances.

The brushless DC motor of the type referred to comprises a stator including a core and coils wound on the core for exciting radially projected pole parts of the stator to alternately oppositely polarize them, and a rotor of a permanent magnet magnetized, for example, to be circumferentially sequentially opposite in the polarity, the stator being disposed so that the direct current fed to the stator coils sequentially in opposite directions will cause the rotor to be rotated, and the motor is useful when employed for driving in particular such a small electrical appliance as a cooling fan and the like.

DISCLOSURE OF PRIOR ART

In the brushless DC motors, generally, the magnetic pole parts projected out of a core part of the stator to oppose the magnetized inner peripheral surface of the outer rotor have been made to be all equally dimensioned, and it has been necessary to provide a separate means for providing to the rotor a starting moment in a predetermined direction because such stator arrangement provides no self-startability to the rotor, so as to have the rotor rotated always in the predetermined direction, but this has been causing the arrangement to be considerably complicated.

A brushless DC motor having the self-startability achieved only by existing constituent members has been suggested in U.S. Pat. No. 4,429,263 to Rolf Müller, in which the rotor comprises a four-pole permanent magnet alternately oppositely polarized symmetrically about the rotary axis, and the stator is formed to have four symmetrically disposed and substantially T-shaped pole parts carrying coils for exciting the pole parts alternately to be of opposite polarities, respective gaps between the inner peripheral surface of the rotor and the outer peripheries of the pole parts being gradually made larger in the counterclockwise direction so that, in non-excitation state, the magnetic flux density in the gaps will be higher on the side of one circumferential end in the clockwise direction of each pole part than that on the side of the other end in the counterclockwise direction, and the rotor will stand still with the center of the respective pole zones disposed as deviated slightly in the clockwise direction from the center of the respective opposing pole parts of the stator. When the stator pole parts are excited respectively to have the same polarity as opposing one of the rotor pole zones, therefore, magnetically repulsive action takes place between the opposing stator and rotor poles to cause the rotor to rotate in the clockwise direction, and thus the brushless motor of the U.S. Patent is provided with the self-startability.

As is clear to those skilled in the art, on the other hand, the extent of the deviation between the stator and rotor poles in the non-excitation state is directly contributive to the starting motion or torque of the motor, and in this respect the motor of the U.S. Patent is still defective in that the starting torque cannot be made larger because the mere gradual increase of the gaps in the counterclockwise direction of the stator pole parts with respect to the rotor poles can result only in a relatively small circumferential deviation of the rotor poles with respect to the stator pole parts.

One of the present inventors, Yasuo Suzuki, has developed various unique models of motors achieving the self-startability with a high starting torque, one of which having been suggested in U.S. Pat. No. 3,614,495 of Oct. 19, 1971 to the inventor and Yasuyoshi Kameyama, and the development has been eagerly continued for years on the basis of the principle of the unique models. Suggested in this U.S. Pat. No. 3,614,495 is an A.C. motor with surface opposing stator and rotor, in which the rotor consists of a disk-shaped permanent magnet magnetized to have alternate poles at regularly radially divided areas, and the stator also disk-shaped is made to have radially extended pole teeth corresponding in number to the rotor poles and including alternately disposed wider main teeth and narrower shading teeth, positions of the latter of which being deviated to be respectively closer to one of the adjacent main pole teeth in a desired rotating direction of the rotor, so that the respective pole teeth excited to be alternately of opposite polarities will cause the rotor self-started to rotate in the deviated direction. When the width of the respective main pole teeth is made twice that of the shading pole teeth, a sufficiently large electric angle difference for a large starting torque can be obtained between the main and shading pole teeth with respect to the rotor poles.

Such arrangement as above in the A.C. motor of the surface-opposing rotor and stator has not been able to be immediately applied to the DC motors of, for example, the outer rotor type, and it has been demanded to provide a DC brushless motor in which the principle of the U.S. Pat. No. 3,614,495 is effectively utilized. In view of this demand, the foregoing one of the present inventors has already suggested in U.S. Pat. No. 4,644,233 a brushless D.C. motor in which one of the projected stator poles positioned forward and rearward in rotational direction of the rotor is deviated from a circumferentially equally spaced position with respect to the other stator pole by predetermined electric angle and is made sufficiently smaller then the other, whereby the rotor is caused to self-start fixedly in either of clockwise or counterclockwise direction to stably start rotating in a single direction. While this arrangement already suggested allows the motor to perform a sufficient self-startability, there have been still left such problems unsolved that the space factor for the coils to be wound on the respective stator poles is deteriorated due to inherently reduced intervals between them, whereby the number of coil turns is made relatively smaller to eventually reduce the motor torque, the coils on the respective stator poles are caused to become likely to directly contact with each other when the coil turns are attempted to be the largest, required coil winding device is caused to become complicated to also render the manufacturing to be complicated, and so on, and it has been a further demand that the motor is improved in these respects.

TECHNICAL FIELD OF THE INVENTION

A primary object of the present invention is, therefore, to provide a brushless DC motor which is capable of achieving the self-startability without increasing required number of parts, simplifying the coil winding work, remarkably elevating the coil winding space factor, and obtaining a sufficiently large starting and/or rotating torque.

According to the present invention, this object can be realized by providing a brushless DC motor comprising a stator including coils wound on a core part for exciting at least a pair of magnetic pole parts projected from the core part to be alternately of opposite polarities, and a rotor of a permanent magnet magnetized to have alternately oppositely polarized surfaces circumferentially continuous in the rotational direction of the rotor and rotated by a direct current fed to the coils of the stator as alternately reversed in the current flowing direction, wherein one of the pole parts of the stator positioned to be mutually equally spaced in mechanical angle is made sufficiently smaller then the other pole part as partly cut off at circumferentially expanding pole tooth part, and the flowing direction of DC fed to the stator coils can be controlled in response to positions of the rotor magnet detected by a Hall effect sensing element provided for detecting the polarity of one of the magnetized surfaces of the rotor magnet at a predetermined position.

Other objects and advantages of the present invention shall become clear from the following description of the invention detailed with reference to preferred embodiments shown in accompanying drawings.

Figure 1:
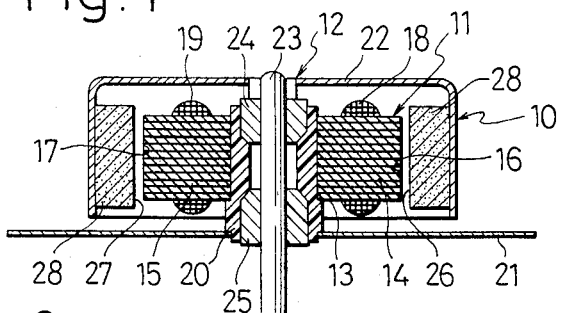
FIG. 1 is a vertical sectional view of a brushless D.C. motor in an outer rotor type according to an embodiment of the present invention taken along line I—I in FIG. 2.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIGS. 1 to 5, there is shown an outer rotor type two-pole brushless DC motor 10 according to an embodiment of the present invention, which comprises a stator 11 and a ring-shaped rotor 12 disposed coaxially about the stator. More specifically, the stator 11 includes a laminar assembly core 13 formed to have two pole parts. Each pole part includes a base portion 14', 15' which projects radially out of a central body part of the core 13 mounted on free ends of the base portions 14', 15' are pole shoes 14, 15 which extend circumferentially. The pole shoes are alternately of wider and narrower circumferential width. The wider pole shoe 14 extends in both circumferential directions from its associated base portion 14', whereas the narrower pole shoe 15 extends in only one circumferential direction from its associated base portion 15'. Therefore, the wider pole forms, for example, a generally T shape while the narrower pole forms, for example, a generally L shape, and a wider end surface 16 of the pole shoe 14 and a narrower end surface 17 of the other pole shoe 15 respectively form a part of a cylindrical surface spaced by a small gap from the inner peripheral surface of the outer disposed rotor 12. In the illustrated embodiment, the base portions 14', 15' are equidistantly spaced from one another, i.e., they are spaced by an angle of 180 degrees in both forward and rearward circumferential directions of the rotor, and the circumferential width of the narrower pole shoe 15 is made sufficiently smaller then that of the wider pole 14. In this case, the circumferential width $D_2$ of the L-shaped narrower pole shoe 15 is preferably made less than 50% of the width $D_1$ of the wider pole shoe 14, whereby the axial central line in the circumferentially expanded direction of the L-shaped narrower pole shoe 15 can be deviated from a position diametrally opposing the central line of the T-shaped wider pole shoe 14, desirably at an electric angle of 25 to 30 degrees in the rotary direction of the rotor 12. The L-shaped narrower pole shoe 15 is thus defined by a pole tooth part 15a extended in only one circumferential direction. While this blank side of the pole shoe 15 may be left as it is, the pole shoe 15 should preferably be at least partly or shortly extended on the particular side from the viewpoint of later described coil winding work, or optimumly be provided with a non-magnetic part 15b comprising, for example, a plastic member symmetric in shape to the tooth part 15a and secured by any proper means onto the blank side of the pole shoe 15 to extend in the other circumferential direction.

In the stator 11, coils 18 and 19 are wound in bifilar manner on radially projected leg portions of the pole shoe 14 and 15, so that a direct current will be supplied to the coils to flow therethrough mutually in opposite directions through a control circuit which will be detailed later so that the pole shoes 14 and 15 will be magnetized alternately to be of opposite polarities. Further, the core 13 is axially secured to a hollow, cylindrical supporting sleeve 20 which in turn is secured at one axial end to a mounting frame 21.

The rotor 12 comprises a reverse cup-shaped yoke 22 secured at the center of the top wall to the upper end of a rotary shaft 23 which is passed through the supporting sleeve 20 and projects downwardly from the frame 21 to be rotatably held in the sleeve 20 by means of upper and lower bearings 24 and 25 provided therein. Fixedly mounted to the inner peripheral wall of the yoke 22 as opposed to the stator pole end surfaces 16 and 17 through the small gap is a cylindrical permanent magnet 28 which has two magnetized surfaces 26 and 27 of mutually opposite polarities and respectively extending substantially over a range 180 degrees in the electric angle (likewise in the mechanical rotary angle in the present instance). The permanent magnet 28 comprises a cylindrical member magnetized as above, but it may be formed with two arcuate permanent magnets which are magnetized to be of opposite polarities to each other on their inner peripheral surface and coupled integrally.

Inside the rotor 12 and at a position spaced in its rotational direction substantially by 90 degrees in the electric angle from the central line of the wider stator pole shoe 14, a Hall effect element 29 formed in an integrated circuit or the like is provided for sensing positions of the rotor by detecting the polarity of one of the magnetized rotor surfaces 26 and 27 which is disposed to oppose the element, detected signals of which are provided to a coil current control circuit which will be explained later.

Figure 2:
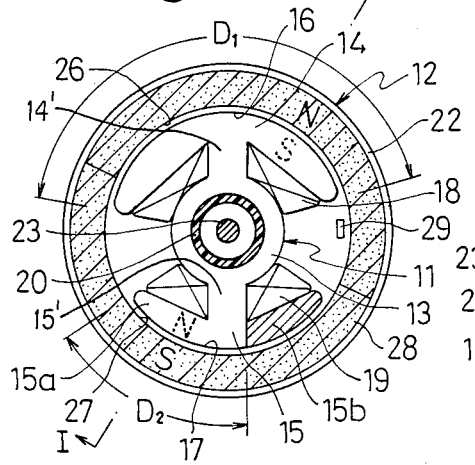
FIG. 2 is a horizontal sectional view of the brushless motor of FIG. 1.
Figure 6:
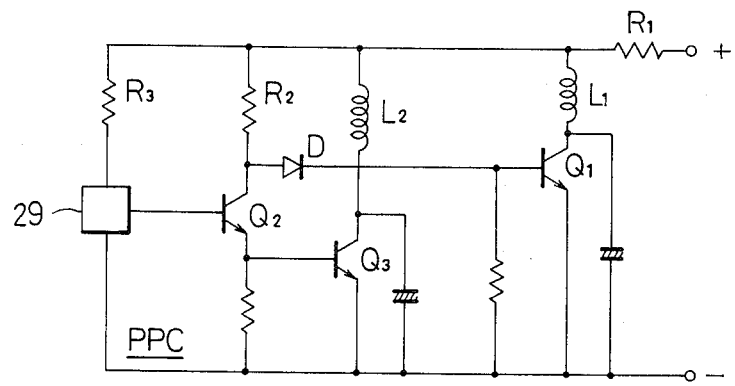
FIG. 6 shows a power supply control circuit for stator coils used in the present invention.

The operation of the brushless motor 10 of the foregoing embodiment will be detailed with reference to FIG. 6 showing a power supply control circuit PPC to the coils 18 and 19. When no electric power is supplied to the coils 18 and 19 and thus the motor is in its non-excited state, the rotor 12 stably remains stationary at such a position as shown in FIG. 2 deviated with respect to the center of the wider stator pole shoe 14, in which the center of the magnetized surface 27 is substantially aligned with the center of the tooth part 15a of the narrower stator pole shoe 15, because the relatively smaller circumferential width of the narrower stator pole shoe 15 causes the magnetic flux from the magnetized rotor surface 27 concentrated to the narrower pole shoe 15 whereas the relatively larger circumferential width of the wider stator pole shoe 14 allows the magnetic flux from the other magnetized rotor surface 26 to pass to the wider pole shoe 14 without concentration or, in other words, magnetic constraining force of the narrower pole shoe 15 with respect to the rotor 12 is larger than that of the wider pole shoe 14. FIG. 2 shows just as an example a state in which the S-pole magnetized rotor surface 27 remains stationary as opposed centrally to the narrower stator pole shoe 15, but it will be apparent that the other N-pole magnetized rotor surface 26 takes the place of the S-pole surface 27 in an event where the N-pole surface 26 is located on the side of the narrower stator pole shoe 15 at the final stage of a rotation of the rotor 12.

In the above state of the rotor, the Hall effect element 29 at the position spaced by the electric angle of 90 degrees from the central line of the wider pole shoe 14 is made to face the magnetized rotor surface 26 (N-pole in FIG. 2) which opposing the wider pole shoe 14 stationarily as deviated toward the element 29 due to the foregoing deviating action with respect to the rotor 12, so that the element 29 will always detect the polarity (here the N-pole) of the magnetized rotor surface opposed to the wider stator pole shoe 14. In the illustrated embodiment, the Hall effect element 29 is of a type activated by the N-pole so that a detection of the N-pole causes the element to generate a detection output voltage, while, with a detection of the S-pole, the detection output voltage is made zero. The coils 18 and 19 are wound preferably continuously in bifilar manner to comprise first and second windings $L_1$ and $L_2$ (FIG. 6), so that a direct current fed to the second winding $L_2$ will magnetize the wider stator pole shoe 14 to be the N-pole and the narrower stator pole shoe 15 to be the S-pole, whereas the first winding $L_1$ excited will cause these pole shoes 14 and 15 magnetized conversely to be the S-pole and N-pole respectively.

Figure 3:
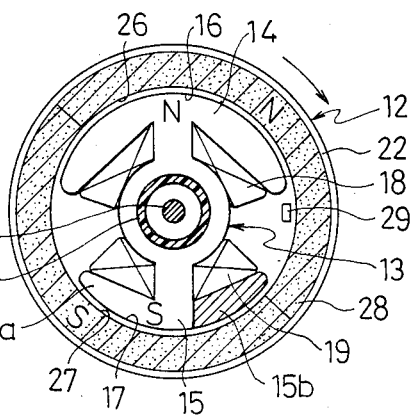
FIGS. 3 to 5 are sectional views similar to FIG. 2 for showing respectively different states in rotating operation of the rotor in the motor of FIG. 1.

When a DC voltage is applied through the power supply control circuit PPC of FIG. 6 to the motor 10 with the rotor 12 in the stationary position of, for example, FIG. 2, the Hall effect element 29 detects the N-pole and provides the output voltage, whereby a base current is caused to flow to a second transistor $Q_2$ to turn it ON, then a base current is also caused to flow to a third transistor $Q_3$ to turn it ON, and a direct current flows through the second winding $L_2$. A base current flowing to a first transistor $Q_1$ on this occasion is so low that this transistor $Q_1$ does not turn ON, and no direct current flows to the first winding $L_1$. As a result, the stator pole shoes 14 and 15 are magnetized to be the N and S poles, respectively, and thus the N and S pole magnetized rotor surfaces 26 and 27 facing these stator pole shoes 14 and 15 respectively of the same polarities are made to magnetically repulse against them to move circumferentially clockwise due to a deviating force caused by means of the foregoing deviated stationary position of the rotor, whereby the rotor 12 is caused to start rotating clockwise as shown in FIG. 3.

Figure 4:
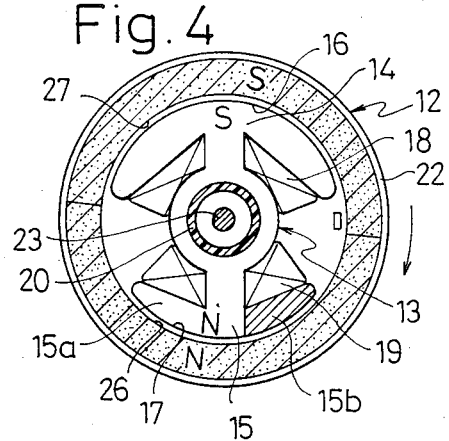
Figure 5:
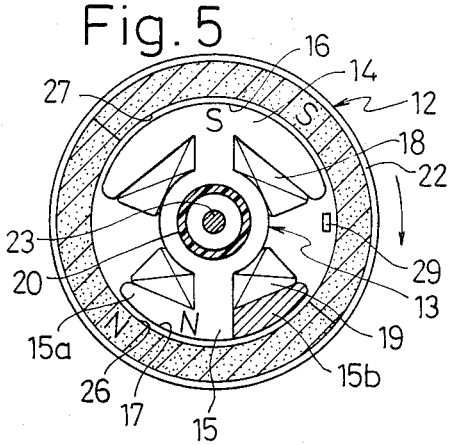

When the rotor 12 is thus rotated and a forward end of the S-pole rotor surface 27 reaches the element 29, the element 29 detects the S-pole to stop generating the output voltage, so that the second and third transistors $Q_2$ and $Q_3$ turn OFF to provide no current to the second winding $L_2$. On the other hand, a base current is now made to flow through resistors $R_1$ and $R_2$ and a diode D to the first transistor $Q_1$ to turn it ON to cause a direct current to flow through the first winding $L_1$. Consequently, as shown in FIG. 4, the stator poles 14 and 15 are magnetized to be the S and N poles, respectively, to be the same polarities as the S and N pole rotor surfaces 27 and 26 here opposing, the repulsive motion of the rotor 12 occurs again, and the rotor 12 further rotates clockwise as shown in FIG. 5. This operation is repeated to carry out continuous rotation of the motor 10.

Figure 7:
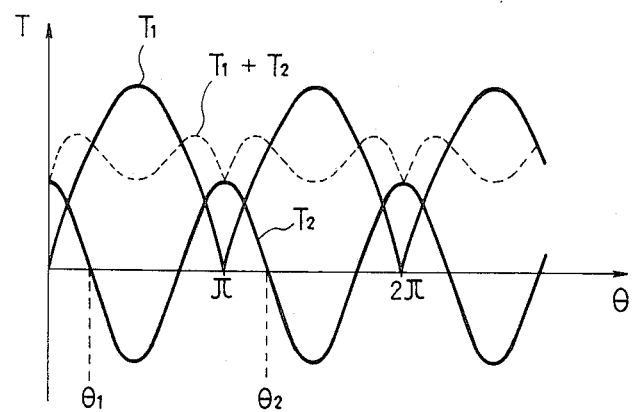
FIG. 7 is a diagram showing operational relationship between the rotational angle and torque of the rotor in the brushless motor of FIG. 1.

In the above operation, there occurs no zero torque point, and yet the motor can achieve a positive self-startability with a sufficiently large starting torque. Referring now to FIG. 7, the rotor 12 is being subjected simultaneously to both of main and auxiliary rotational torques such as shown by curves $T_1$ and $T_2$, in which the main torque $T_1$ is a resultant from a magnetic force generated by the magnetization of the stator pole shoes 14 and 15 with the DC excited coils and a magnetic force of the permanent magnet 28, the main torque $T_1$ occurring upon every half cycle of rotation, and the auxiliary rotational torque $T_2$ is a reluctance torque mainly due to a magnetic force that achieves the deviated stationary position of the rotor in the non-excited state. The auxiliary torque $T_2$ has a frequency which is twice that of the main torque $T_1$, but the deviating action of the partly blank or cut-off narrower stator pole shoe 15 with respect to the wider stator pole shoe 14 causes the phase of the auxiliary torque $T_2$ to be shifted in the rotational direction of the rotor from that of the main torque $T_1$ by a rotary angle of $\theta_1$ or $\theta_2$, for example, so that a composite rotary torque of $T_1$ and $T_2$ will be as shown by a dotted line curve $T_1+T_2$, which involves no zero torque point and is generally flat to lie substantially along a fixed level, whereby the motor 10 can be self-started and driven to be continuously smoothly rotated. It will be readily appreciated in this connection that the remarkable deviating action of the partly blank or cut-off narrower stator pole shoe 15 as well as the much smaller circumferential width also of the pole shoe 15 are effective to remarkably enlarge the deviation of the rotor 12 with respect to the wider stator pole shoe 14 for achieving the larger starting torque.

Figure 8:
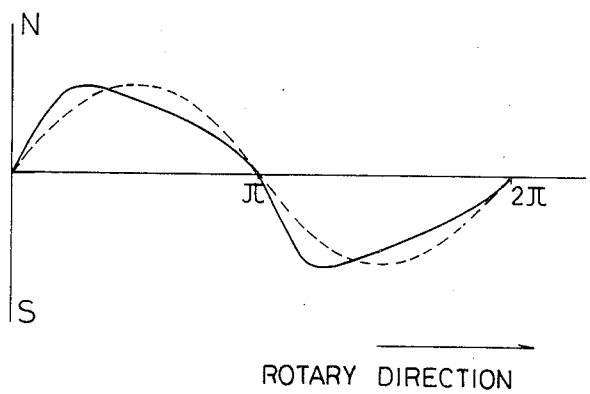
FIG. 8 is a diagram showing a magnetization distribution in permanent magnet forming the rotor of the brushless motor shown in FIG. 1.

In an optimum aspect of the present invention, further, the two magnetized rotor surfaces 26 and 27 of the permanent magnet 28 are so provided that the peak points in their magnetization distribution are deviated in a direction opposite to the rotary direction of the rotor 12 from regularly magnetized peak points, preferably by about 45 degrees in the electric angle, as shown in FIG. 8 in which a solid line curve represents the deviated magnetization distribution of the magnetized rotor surfaces 26 and 27 in the present invention, while a dotted line curve represents the regular magnetization distribution of the rotor in, for example, the foregoing U.S. Pat. No. 4,644,233.

In cooperation with the foregoing deviating action of the partly blank or cut-off narrower stator pole shoe 15, the deviated magnetization of the rotor 12 makes it possible to further enhance the deviating action with respect to the rotor 12 and, in particular, to have the auxiliary torque $T_2$ deviated effectively by about 40 degrees in the electric angle in the rotary direction of the rotor as shown in FIG. 7 so as to assure the high starting torque.

Figure 9:
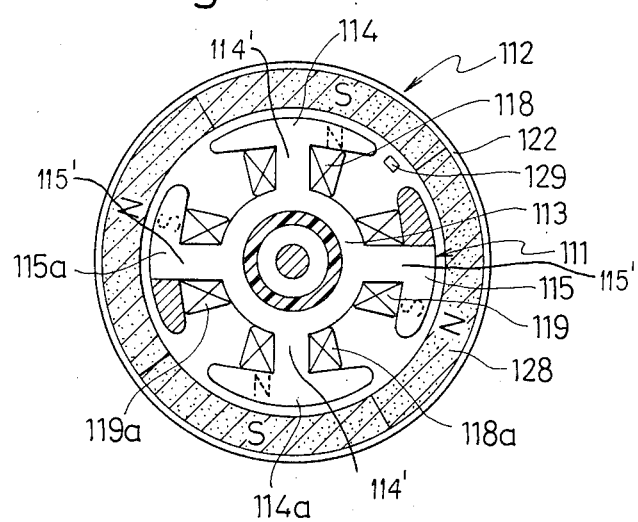
FIG. 9 is a horizontal sectional view similar to FIG. 2 of the outer rotor type brushless DC motor in another embodiment of the present invention.

Referring next to another embodiment of the present invention with reference to FIG. 9 also in the case of the outer rotor type brushless DC motor 10 but adapted to four-pole arrangement, in which substantially the same constituent members as those in FIGS. 1 to 5 are denoted by the same reference numerals but added by 100 and, where two of the same member are employed, second one of such members is denoted by additional suffix "a". In this embodiment, a stator 111 includes equidistantly spaced bases 114°, 115°, a pair of wider projected magnetic pole shoes 114 and 114a mutually opposed along a diametral line and a pair of narrower projected magnetic pole shoes 115 and 115a mutually opposed along on another diametral line, respectively in symmetrical relation to each other with respect to the rotary axis of the rotor. However in this embodiment, too, the narrower poles 115 and 115a are partly cut off to be blank, i.e., they extend in only one circumferential direction from their bases, so that their circumferential width will be preferably less than 50% of the wider pole shoes 114 and 114a. Further, a Hall effect element 129 is disposed as spaced from the central line of the wider pole shoe 114 in the rotor's rotational direction by an electric angle of preferably 90 degrees. A rotor 112 comprises a cylindrical permanent magnet 128 having four alternately oppositely magnetized surfaces 126, 127 126a and 127a in correspondence in number to the stator poles, the peak magnetization-distribution points of which surfaces are preferably deviated by about 45 degrees in the electric angle in a direction opposite to the rotary direction of the rotor 12.

Other arrangement and operation of this embodiment are substantially the same as those of the embodiment of FIGS. 1 to 5. It should be readily appreciated that, with this arrangement of FIG. 9, the same deviating action with respect to the rotor 112 as in the case of FIGS. 1 to 5 can be obtained and the smooth rotation of the motor can be assured.

The present invention may be modified in various ways. For example, the number of the stator poles as well as that of the permanent magnet rotor poles may be increased as required. Further, the permanent magnet rotor may be disposed inside the stator when a columnar permanent magnet polarized on the peripheral surface and a stator arranged to surround such magnet are employed.

What is claimed as our invention is:

1. A self-starting brushless DC motor comprising a rotor rotatable about an axis of rotation and including a permanent magnet magnetized to have circumferentially alternately opposite rotor poles; a stator provided with projecting poles corresponding in number to said rotor poles; coils wound on said projecting poles, said projecting poles each including a generally radially extending base means and a circumferentially extending shoe means extending circumferentially from a free end of said base means, said base means of said projecting poles being spaced apart circumferentially equidistantly, said circumferentially extending shoe means of said projecting poles being of alternately wider and narrower circumferential width and formed of magnetizable material, said coils being connected to alternately excite the wider and narrower shoe means in opposite polarities; a Hall effect element opposed to said rotor for detecting the polarity of one of the rotor poles at a predetermined position and providing a control signal dependent on said polarity detected; and means responsive to said control signal for supplying a direct current of a predetermined direction to the coils for said excitation; said narrower shoe means extending in only one circumferential direction from said free end of its associated base portion to enable the rotor to self-start in one direction with an enhanced starting torque.

2. A motor according to claim 1, wherein said narrower pole shoe means of said stator have a circumferential width of less than 50% of said wider pole shoe means.

3. A motor according to claim 1, wherein said alternately opposite rotor poles of said permanent magnet have deviated peak points of magnetization distribution in their magnetized surfaces, said deviation being in a direction opposite to the rotary direction of the rotor.

4. A motor according to claim 3, wherein said deviation of said peak magnetization-distribution points is set to be substantially more than 40 degrees in the electric angle.

5. A motor according to claim 1, wherein a member of non-magnetizable material extends circumferentially from said free end of said base portion carrying said narrower shoe means, said member extending in a circumferential direction opposite that in which said narrower shoe means extends.

* * * * *